(12) United States Patent
Chan (10) Patent No.: US 10,402,586 B2
(45) Date of Patent: Sep. 3, 2019

(54) PATIENT PRIVACY DE-IDENTIFICATION IN FIREWALL SWITCHES FORMING VLAN SEGREGATION

(71) Applicant: Tat Wai Chan, Hong Kong (HK)

(72) Inventor: Tat Wai Chan, Hong Kong (HK)

( * ) Notice: Subject to any disclaimer, the term of this patent is extended or adjusted under 35 U.S.C. 154(b) by 321 days.

(21) Appl. No.: 15/479,303

(22) Filed: Apr. 5, 2017

(65) Prior Publication Data

US 2018/0293399 A1    Oct. 11, 2018

(51) Int. Cl.
*G06F 21/62* (2013.01)
*H04L 29/06* (2006.01)
*G06F 21/10* (2013.01)
*G06Q 20/12* (2012.01)

(52) U.S. Cl.
CPC ........ *G06F 21/6245* (2013.01); *G06F 21/105* (2013.01); *G06Q 20/1235* (2013.01); *H04L 63/101* (2013.01); *G06F 2221/0713* (2013.01)

(58) Field of Classification Search
None
See application file for complete search history.

(56) References Cited

U.S. PATENT DOCUMENTS

| | | | |
|---|---|---|---|
| 9,846,716 B1 * | 12/2017 | Scott | G06F 9/546 |
| 2002/0073099 A1 * | 6/2002 | Gilbert | G06F 21/6227 |
| 2008/0172337 A1 * | 7/2008 | Banfield | G06Q 10/10 705/51 |
| 2009/0207262 A1 * | 8/2009 | Kurosawa | H04N 5/4403 348/211.99 |
| 2009/0282036 A1 * | 11/2009 | Fedtke | G06F 21/6254 |
| 2009/0287502 A1 * | 11/2009 | Roberts | G06F 19/328 705/3 |

* cited by examiner

*Primary Examiner* — Fatoumata Traore (57) ABSTRACT

The present disclosure relates to enabling users to logging access information associated with their license via a virtual network. In one example of the present disclosure, user data associated with a user having an account on a virtual network is obtained. Access control list associated with an identified application pid from an application database is then obtained, the identified application pid having been previously purchased by the user and the identified application being selected by the user from a user device. An application programming interface of the virtual network is then invoked to publish the transaction associated with the identified application pid to a central log storage.

13 Claims, 5 Drawing Sheets

PATIENT PRIVACY DE-IDENTIFICATION IN FIREWALL SWITCHES FORMING VLAN SEGREGATION

FIELD OF THE INVENTION

The presently disclosed technology generally relates to network segregation systems, and more specifically to systems for accessing information associated with licenses via a virtual network.

BACKGROUND OF THE DISCLOSED TECHNOLOGY

Protecting a patient's privacy has always been a duty of physicians. Relatively recent technological innovations such as the World Wide Web, electronic medical record (EMR) systems, and increased connectivity between disparate medical institutions, have constantly increased the challenge of protecting patient privacy at the expense of facilitating the sharing of patient data.

The present invention is an attempt to meet the challenge of protecting patient privacy by facilitating the sharing of patient data via an automated de-identification VLAN, resulting in a cost-effective solution as EMRs become more common and widespread and patient data become increasingly accessible over the World Wide Web.

Another goal is designed to computer assisted securing of application access therefor, and, more specifically, to methods, devices and systems to provide comprehensive logging assistance including the use of a central log storage hosted on a virtual network.

SUMMARY OF THE INVENTION

A firewall switch that allows user remote access, provides virtual networks and logging support to applications. The invention is an attempt to meet the challenge of protecting patient privacy by facilitating the sharing of patient data via an automated de-identification VLAN, resulting in a cost-effective solution as EMRs become more common and widespread and patient data become increasingly accessible over the World Wide Web. Three separate virtual networks (VLAN) are configured by default for the incoming patient data. The firewall makes use of a combination of data inspection software, whitelist and blacklist filters, and a set of user-specified patient identifiers to effectively route each incoming patient data to one of the three VLANs. Firstly, the firewall routes all incoming data that do not comprise any user-specified patient identifiers to a first VLAN. Secondly, the firewall routes all incoming data that comprise at least one of the user-specified patient identifiers by masking those patient identifiers to a second de-identified VLAN, where those patient identifiers are routed to a third encrypted VLAN for the secure handling of the sensitive data.

In a first aspect, an embodiment provides a method for selecting access to an application remotely over a network. The method includes receiving, at a server, an application process identifier (pid) from a user device. Access control list is determined based on the pid, for example, by looking up the pid in a database. At least one access control list is determined based on the user. The method also includes generating a system activity report for the product identified by the pid based on the user license and the at least one access control list. The system activity report includes at least one graphic indication of whether the user license meets the at least one access control list. The system activity report is sent to a central log storage hosted on the same managed switch.

In another aspect, an embodiment provides an apparatus (such as a server, for example) for selecting access to an application remotely over a network. The apparatus includes one or more processors and one or more memories. The memories storing computer program code. The memories and the computer program code are configured to, with the processors, cause the apparatus to perform actions. The actions include receiving, at the apparatus, a pid and a user license from a first device. Access control list is determined based on the pid. At least one access control list is determined based on the user license. The actions also include generating a system activity report for the application identified by the pid based on the user license and the at least one access control list. The system activity report includes at least one graphic indication of whether the license meets the at least access control list. The system activity report is sent to a central log storage hosted on the same managed switch.

In a further aspect, an embodiment provides a computer readable medium for reviewing a product and providing a recommendation. The computer readable medium is tangibly encoded with a computer program executable by a processor to perform actions. The actions include receiving a pid and a user license from a first device. Access control list is determined based on the pid. At least one access control list is determined based on the pid. The actions also include generating a system activity report for the application identified by the pid based on the user license and the at least one access control list. The system activity report includes at least one graphic indication of whether the license meets the at least one access control list. The product report is sent to a central log storage hosted on the same managed switch.

A better understanding of the disclosed technology will be obtained from the following brief description of drawings illustrating exemplary embodiments of the disclosed technology.

DETAILED DESCRIPTION OF EMBODIMENTS OF THE DISCLOSED TECHNOLOGY

References will now be made in detail to the present exemplary embodiments, examples of which are illustrated in the accompanying drawings. Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

A firewall switch that allows user remote access, provides virtual networks and logging support to applications. The invention is an attempt to meet the challenge of protecting patient privacy by facilitating the sharing of patient data via an automated de-identification VLAN, resulting in a cost-effective solution as EMRs become more common and widespread and patient data become increasingly accessible over the World Wide Web. Three separate virtual networks (VLAN) are configured by default for the incoming patient data. The firewall makes use of a combination of data inspection software, whitelist and blacklist filters, and a set of user-specified patient identifiers to effectively route each incoming patient data to one of the three VLANs. Firstly, the firewall routes all incoming data that do not comprise any user-specified patient identifiers to a first VLAN. Secondly, the firewall routes all incoming data that comprise at least one of the user-specified patient identifiers by masking those patient identifiers to a second de-identified VLAN, where those patient identifiers are routed to a third encrypted VLAN for the secure handling of the sensitive data.

Various embodiments enable a computer, such as a mobile phone, tablet, etc., to assist users to effectively consider their security and privacy interests and help them to select applications that meet their needs. By using an application, or app, a user can locate information regarding a specific application pid which is provided to them in a manner that easy to understand and tailored to their preferences.

Everyone can benefit from the access to privacy data provided by various embodiments. By providing an interface with design emphasis placed on legibility, simplicity, and ease of navigation, even people who have not used the interface before can quickly access important application information. The interface is usable by all ages, experience levels, and demographics.

In general, various embodiments of the device may include cellular telephones, tablets, computers, digital cameras, gaming devices, music players, as well as other devices that incorporate combinations of such functions.

Figure 1:
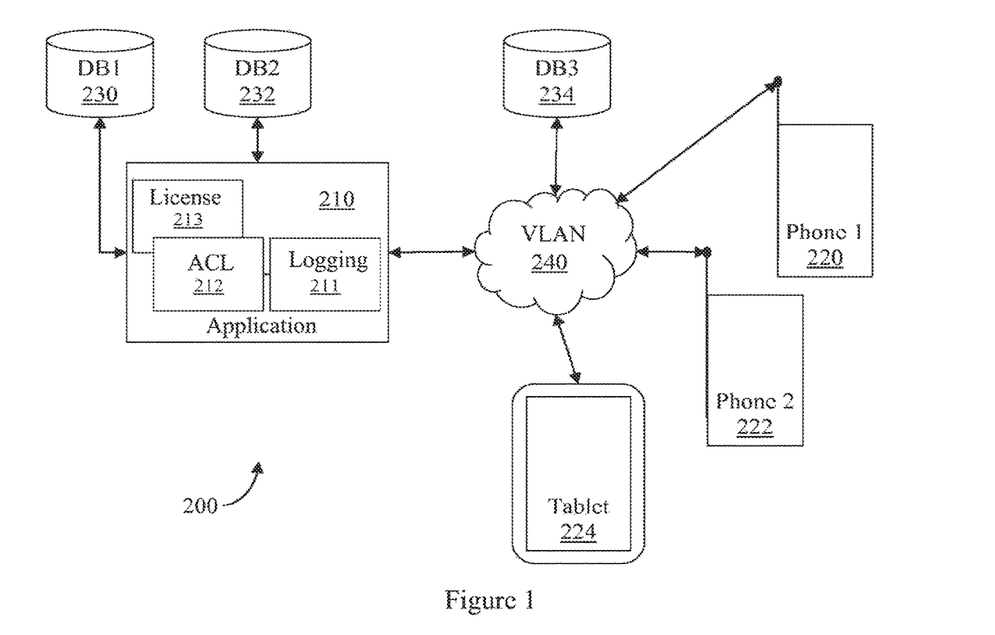
FIG. 1 shows a block diagram of a computer system suitable to practice an embodiment.

FIG. 1 shows a block diagram of a computer system 200 suitable to practice an embodiment. As shown in FIG. 1, the server 210 includes a controller, such as a license, and a computer-readable medium embodied as a memory that stores Access Control List (ACL) and user licenses 213. The server 210 is connected to a plurality of local databases, such as an application database DB1 230 and a directory service 232. The server 210 may communicate via the internet 240 with a remote database, such as a directory service and encrypted logging service 234. The encrypted logging service guarantees privacy protection by keeping the encryption key hidden from the user.

Data stored in the databases 230, 232, 234, such as user profiles or product information, may be encrypted. Access to the databases 230, 232, 234 may also be restricted by access controls or other means to prevent unwanted third party access without proper authorization.

A user on any one of various devices, such as Phone 1 220, Phone 2 222, and the Tablet 224, may log in to the server 210 in order to access their applications. Communications between the server 210 and the user devices 220, 222, 224 may be encrypted.

The application 213 and/or the databases 230, 232, 234 may be of any type suitable to the VLAN and may be implemented using any suitable managed switches. The logging and encryption 211 may be of any type suitable to the local technical environment, and may include general purpose computers, special purpose computers, microprocessors and multicore processors, as non-limiting examples. A communication interface (e.g., one used to access the Internet 240) may be of any type suitable to the virtual network and may be implemented using any suitable communication technology such as RF systems, including the use of near field communication systems, optical communication systems, such as infrared systems and/or optical scanning systems, induction communication systems, wired connection interfaces, such as an Ethernet connection or a fiber optical connection, or a combination of such components. Additionally, the communication interface may be a bidirectional interface using transmitters, receivers, and/or transceivers, or, as appropriate for the embodiment, a unidirectional interface.

An app (having a user interface (UI)) is provided which allows users to access their account, profile, lists, applications, etc. The app may be run on any suitable electronic device, for example, a phone, tablet device or personal computer.

When accessing the service, a user is presented with a log in screen. The user can provide their log in information, such as an email address and password for example, or, if they do not have an account, they can set up a new account.

The "Scan or Search" button allows the user to scan and/or search for applications, view the compatibility of those applications with their personal licenses, and to add those to their access control lists. Selecting this button takes the user to the Scan and Search screen 900 in FIG. 2.

Users may sign in using a website or using the app. Upon first opening the app, the user is prompted to sign in or create a new account. The account creation screen is the first page they see upon selecting "create new account." This screen helps the user set up various settings and preferences, for example, username, password and email address.

The account settings screen is where the user may change all settings associated with their account. It may include the following fields: username, password, email address, and preferred font size. Some preferences, such as the font size, may be initially set based on a default setting.

The user may select between a display font of small type size, medium type size, and large type size. In other embodiments, additional font sizes may be presented. Alternatively, the app may access general setting on the device for use as default settings on the app.

In another non-limiting embodiment, the user may also select a preferred language, preferred units of measurement, e.g., metric or US standard, etc.

As noted above, different devices may sign into the same account. This includes computers, tablets, and smart phones, each of which may have their own identity on the website and app. The account may include a number of profiles; however, each device may turn on or off different profiles. This controls what is seen in the system activity report as described in further detail below.

The information for an account and its profiles syncs over the internet across all devices with that account whenever updated or changed. For example, the system may push out updates to a profile to local copies stored on the various devices, for example, when the user logs into the system. In one alternative embodiment, changes may be made to a central database so that when a user accesses their account the information in that account is the most recent.

An account may have multiple profiles. The system activity history and account information are tied to one account—they do not vary based on the profile. Accounts may be viewed as connecting profiles for licenses and groups of people (or individuals) while access control lists may be viewed as individual within the groups.

Once a user has established an account, they can populate it with one or more profiles. All profiles are tied to an account, regardless of what device they are created on. Additionally, the user can access profiles of other users.

Figure 2:
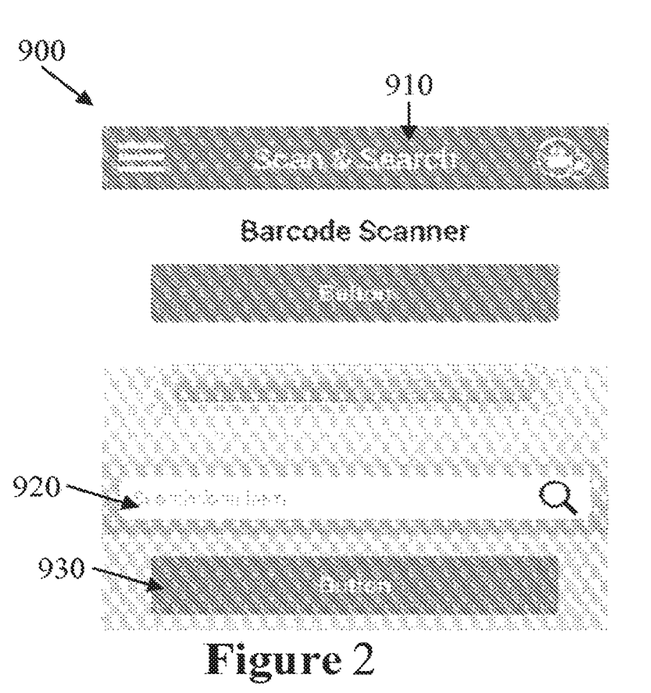
FIG. 2 illustrates a scan and search screen.
Figure 3:
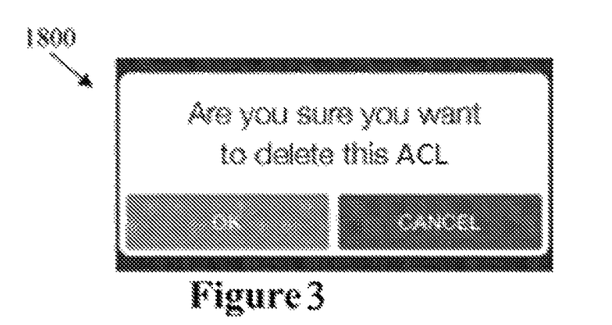
FIG. 3 illustrates a pop-over screen to confirm deleting a access control list.

FIG. 2 illustrates a scan and search screen 900. This screen allows a user to look up an application in order to see a system activity report for it. The user may scan information identifying the application or they may search for applications using a text search 920.

In this non-limiting embodiment, the user can scan the application's pid, e.g., using a camera on a phone. Based on information from the pid, the system can access a database and retrieve the application information. In further embodiments, the user may be able to use other means to quickly identify the application, for example, by reading an RFID chip/interface and/or by sending a textual description of the application or vendor. Using a NFC scanner, the phone may be able to receive the UPC code for the application, e.g., from an RFID interface on a promotional display. Processing a textual description of the application, for example, by using character recognition and/or comparison, allows the system to identify the application from a free text.

Once the application is identified, the app can query a database or data service, such as a local database or another third party database with an API data stream, for the application information. The system may also access additional databases in case one database does not have all the relevant information. The information from the various databases can be combined to create a full access control list which can then be stored in a local database for future reference. The information within the databases which is relevant to the application can be returned on the system activity report screen. When accessing additional databases the UI may provide a notification to the user indicating that an in-depth search is being performed.

Additionally, a user may scan a license. The app performs a search to identify relevant license information and any associated applications, for example, by querying a vendor server application programming interface (API). The app may then display a list of the associated applications to the user. The list may also identify access control list available to the user. The license information may also be stored for future reference, for example, in a license keeper database.

If the product or coupon cannot be identified or a database search provides no results, the user may be provided a notification. The user may press the 'CANCEL' button to return to the Scan & Search screen 900 and either try scanning again or performing a manual search.

While many access control lists may be stored in databases, new ACL may also be added by users. The user can input the ACL and the system can prepare a system activity report based on this information. These user-defined items may be flagged for verification before being added to an internal database for access by all users or they may be added automatically and the information confirmed later.

The search field 920 may also be used to perform additional searches, either within the results provided or as a new search. For example, the user can replace the terms used with a new search and press a "search" button 930.

The search results may be compiled from multiple database searches. As a non-limiting example, the system may check an internal database and then supplement the results by searching an external database. The combined results may also be sorted based in part on the source of the results, such as, where results from the internal database are closer to the top of the list while results from remote databases are closer to the bottom as one example.

The log of prior access activities may be maintained in accordance of various data retention restrictions. The log may be encrypted and secured from unauthorized access by third parties. The log may also be configured to automatically remove entries, for example, to delete data for days older than three months.

Active licenses are license for which an item in an active access control list has been marked, "yes." If there are multiple licenses available, the greater purchase value of license can be moved to the active list. Alternatively, the soonest to expire may be moved to the active list.

The license keeper can generate reminders about the expiration of time sensitive licenses. Reminders may automatically go off at 30, 10, and 5 minutes to expiration. These notifications can appear on the phone showing the remaining time available.

If a license is available for a scanned application or a search result, the system activity report screen can notify the user accordingly.

Figure 4:
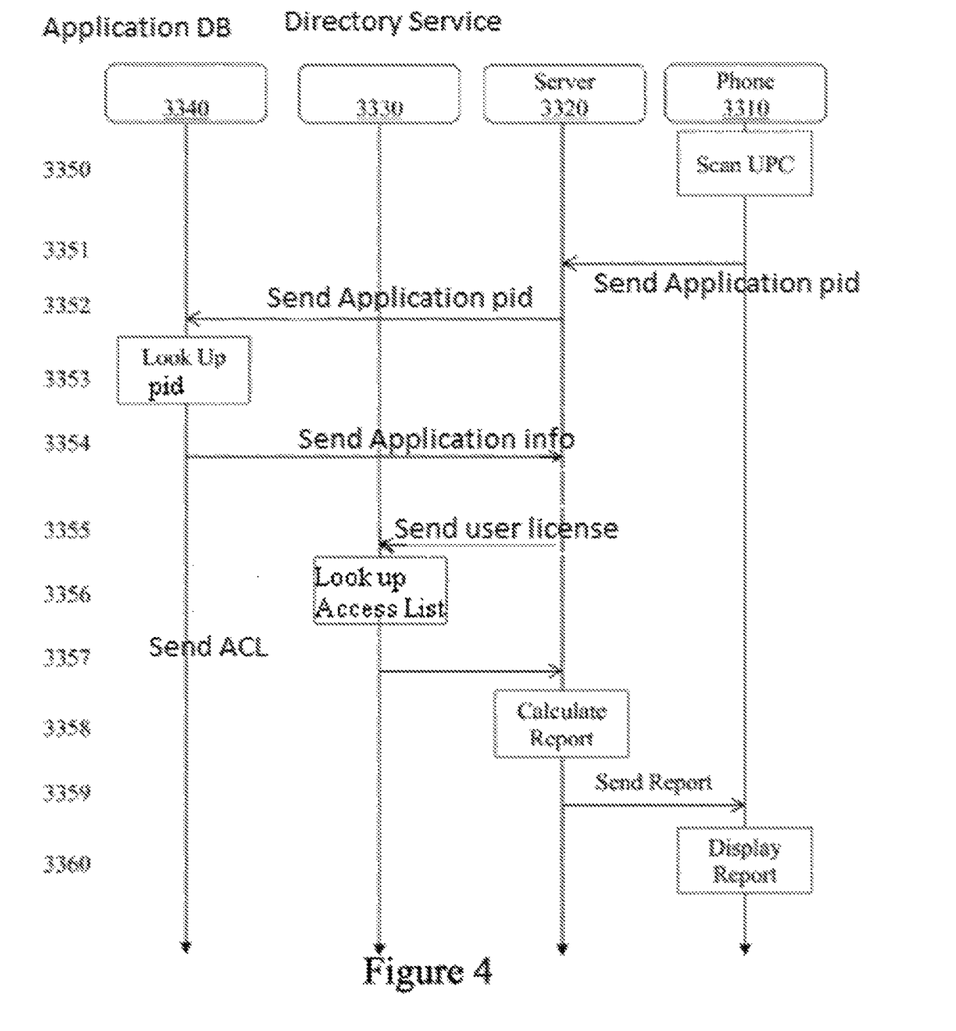
FIG. 4 shows a signaling diagram of a scan and search operation in accordance with an embodiment.

FIG. 4 shows a signaling diagram of a scan and search operation in accordance with an embodiment. In this non-limiting embodiment, at time 3350 a user uses their phone 3310 to scan a UPC. The scanned UPC and an application pid are sent to the server 3320 at time 3351. Then, at time 3352, the server 3320 relays the application pid to a Application DB 3340, which looks up the application pid at time 3353 to get the application information and sends the application information to the server 3320 at time 3354. The server 3320 also sends, at time 3355, the user license to a Directory Service 3330 which determines the associated access control lists at time 3356 and provides the relevant data to the server 3320 at time 3357.

At time 3358, once the server 3320 has accessed the user licenses and access control lists, the server 3320 calculates a system activity report. This information is then sent at time 3356 to the phone 3310 which displays it for the user at time 3360.

In alternative embodiments, the phone 3310 provides one or more user licenses to the server 3320 which uses the user license to look up the associated ACL in the Directory Service 3330.

In a further alternative embodiment, the Directory Service 3330 may send only the relevant profile preferences to the server 3320, for example, the Directory Service 3330 may compile a list of only the application access details indicated as being watched by the ACL. As one non-limiting example, there are two ACLs in the group.

In another alternative embodiment, the server 3320 may send the application pid to the Application DB 3340 and the user license to the Directory Service 3330 in any appropriate timing order or simultaneously, for example, the server 3320 may send the license and then before receiving the associated ACL, the server 3320 may also send the application pid.

As a non-limiting example, the server 3320 provides calculation of the reports, lists and applications. This allows additional features to be added and existing services to be updated at the server 3320, so that the data on the user's phone 3310 is not impacted by the upgrade and the user is able to enjoy a consistent experience.

The relative times for various actions described in FIG. 4 are purely exemplary and imply no particular order. Further, the operations can be used in any sequence when appropriate and can be partially used. Additional embodiments can employ additional actions; combine multiple actions; and/or perform actions simultaneously. For example, the server 3320 may send the user license while awaiting the ACL or may send the user license prior to sending the application pid.

As a further example, the messages and communications between the various elements 3310, 3320, 3330, 3340 may be encrypted or otherwise protected from third party interception. Likewise, data stored in the Application DB and Directory Service 3330, 3340 may also be protected from unauthorized access. Accordingly, additional actions may be taken to encrypt/decrypt communications and database lookups.

As described above, various exemplary embodiments provide methods, apparatus and computer programs to provide logging assistance including the use of a mobile reader app.

Figure 5:
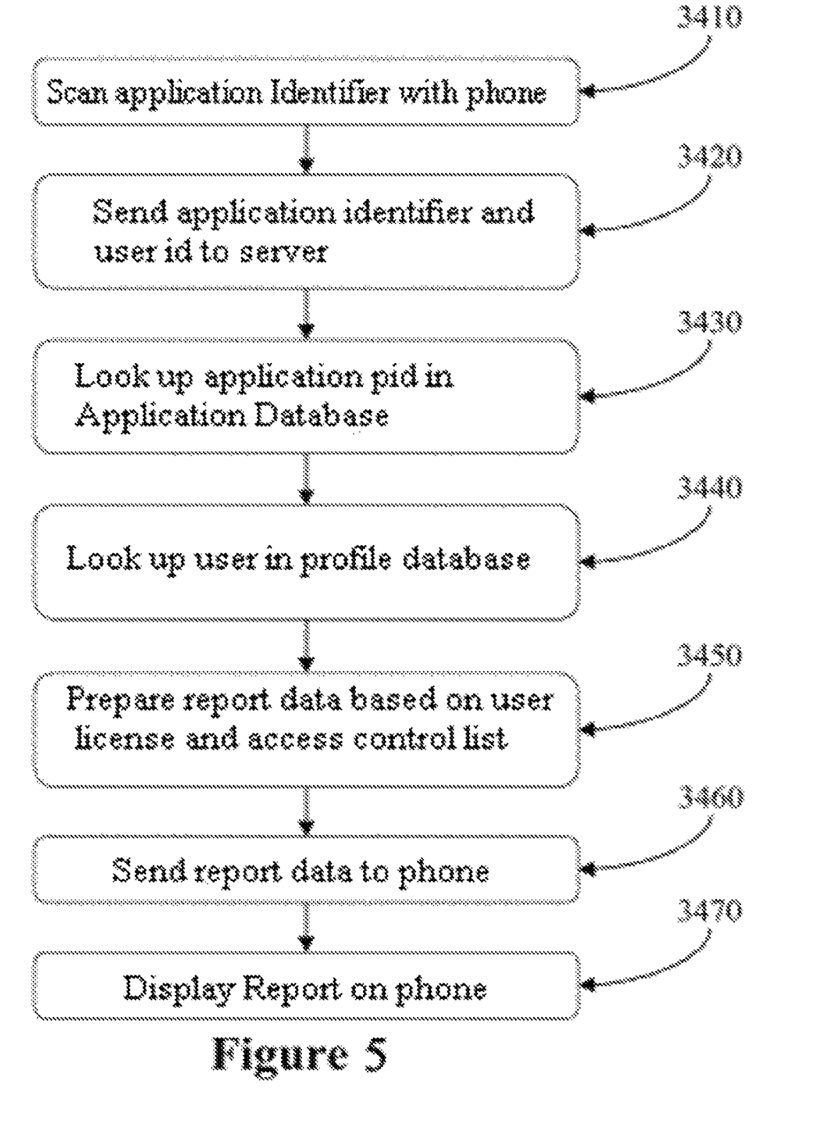
FIG. 5 is a simple block diagram of a method for performing a scan and search operation in accordance with an embodiment.

FIG. 5 is a logic flow diagram that illustrates a method, and a result of execution of computer program instructions, in accordance with exemplary embodiments. In accordance with an embodiment a method performs a step of scanning an application pid with a phone, for example, by scanning a UPC or reading an RFID. The phone sends the application pid to the server. The server looks up the application pid in application database, and the server looks up the user license in a Directory Service. Based on the user preferences and the access control list from the data base, the server prepares system activity report data. The server sends the report data to the phone and the phone displays the report.

The various blocks shown in FIG. 5 may be viewed as method steps, as operations that result from use of computer program code, and/or as one or more logic circuit elements constructed to carry out the associated functions.

An embodiment provides a method for reviewing an application and providing a recommendation. The method includes receiving, at a server, an application pid and a user license from a first device. Application information is determined based at least in part on the user license. At least one profile preference is determined based at least in part on the user license. The method also includes generating a system activity report for the ACL identified by the user license based at least in part on the application information and the at least one profile preference. The system activity report is sent to the first device from the server.

In a further embodiment of the method above, the method also includes determining the application pid by scanning a label on a mobile phone.

In another embodiment of any one of the methods above, the method also includes displaying the system activity report on a display at the first device.

In a further embodiment of any one of the methods above, determining the at least one user preference includes looking up the user license in a Directory Service and receiving preference data for each active ACL associated with the license.

In a further embodiment of any one of the methods above, the method also includes determining whether at least one user license associated with the application pid; and, in response to determining that at least one license for the application is associated with the application pid, adding a graphic indication to the system activity report indicating that a license is available for the application.

In a further embodiment of any one of the methods above, the method also includes receiving an indication that the application is being purchased; and adding an indicator that the application has been purchased to at least one access control list associated with the license. The indicator that the application has been purchased may include an identifier of a vendor where the application has been purchased.

In another embodiment of any one of the methods above, generating the system activity report includes adding a list of at least one access control list of the product. The list is sorted based at least in part on the at least one user preference.

In a further embodiment of any one of the methods above, generating the system activity report includes adding a list of at least one logging property of the application. The list is sorted based at least in part on the at least one user preference.

Another embodiment provides an apparatus (such as a server, for example) for reviewing a product and providing a recommendation. The apparatus includes one or more processors and one or more memories. The memories storing computer program code. The memories and the computer program code are configured to, with the processors, cause the apparatus to perform actions. The actions include receiving, at the apparatus, an application pid. Application information is determined based at least in part on the application pid. At least one user preference is determined based at least in part on the user license. The actions also include generating a system activity report for the application identified by the pid based at least in part on the at least access control list. The system activity report is sent to a central log storage.

In a further embodiment of the apparatus above, the actions also include determining the application pid by scanning a label on a mobile phone.

Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

The foregoing description has been directed to particular embodiments. However, other variations and modifications may be made to the described embodiments, with the attainment of some or all of their advantages. It will be further appreciated by those of ordinary skill in the art that modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A computer-implemented network dataflow monitoring system, comprising data inspection software, whitelist and blacklist filters, and a set of user-specified patient identifiers, having software components for performing:
   obtaining, by a computer, user data associated with a user having an account on a first virtual network (VLAN);
   obtaining, by the computer, an access control list (ACL) associated with an identified application pid from an application database, the identified application pid having been previously authorized for access by the user and the identified application pid being accessed by the user from a user device; and
   invoking, by the computer, an application programming interface (API) of the first virtual network to publish a transaction associated with the identified application pid to a central log storage hosted on the second virtual network (VLAN), wherein a network segregation on a managed switch logically separates the first VLAN from the second VLAN, the second VLAN being encrypted with an encryption key that the user does not have access to.

2. The computer-implemented method of claim 1, wherein obtaining the access control list further comprises transmitting, by the computer, a request for the access control list to a application directory service.

3. The computer-implemented method of claim 1, further comprising obtaining, by the computer, license information associated with a user purchase, and wherein obtaining the user data, obtaining the access control list, and obtaining the license information comprises electronically receiving, by the computer, the user data and access control list from a retailer from which the user purchased the identified application pid.

4. The computer-implemented method of claim 1, further comprising: obtaining, by the computer, license information associated with a user license, and further comprising storing, by the computer, the user data, license information, and access control list in a database; and storing, by the computer, user data for a plurality of users, license information for a plurality of licenses, and access control list for a plurality of application pid in the database.

5. The computer-implemented method of claim 1, wherein obtaining access control list further comprises: receiving, by the computer, a request from the user device regarding the identified application pid; and retrieving, by the computer, the access control list from a web server associated with a application directory service.

6. The computer-implemented method of claim 1, further comprising transmitting, by the computer, the access control list via a communication network using an API to a web server associated with a third party web service, the third party web service being configured to receive access control list from a plurality of sources, tabulate access control list for a plurality of applications, and enable a plurality of users to access the access control list for the plurality of applications.

7. The steps of claim 1, further comprising:
   detecting, by the computer, no occurrence of the set of user-specified patient identifiers in the user data;
   in response to detecting no occurrence of the set of user-specified patient identifiers in the user data:
     a. routing the user data to the first VLAN;
   detecting, by the computer, an occurrence of the set of user-specified patient identifiers in the user data;
   in response to detecting the occurrence of the set of user-specified patient identifiers in the user data;
     b. routing the user data by masking the set of user-specified patient identifiers to a second de-identified VLAN: and
     c. routing the set of user-specified patient identifiers to a third encrypted VLAN.

8. A non-transitory computer-readable medium storing instructions that, when executed by a processing resource, cause the processing resource to perform steps to whitelist and blacklist a set of user-specified patient identifiers, the steps comprising:
   obtaining user data associated with a user having an account on a first virtual network (VLAN);
   obtaining an access control list associated with an identified application pid from an application database, the identified application pid having been previously authorized for access by the user and the identified application pid being accessed by the user from a user device; and
   invoking an application programming interface API of the first virtual network to publish a transaction associated with the identified application pid to a central log storage hosted on a second virtual network (VLAN), wherein a network segregation on a managed switch logically separates the first virtual network (VLAN) from the second virtual network (VLAN), the second virtual network (VLAN) being encrypted with an encryption key that the user does not have access to.

9. The non-transitory computer-readable medium of claim 8, wherein the computer-executable instructions cause the processing resource to further perform the steps comprising: storing user information, wherein the storing user information is further comprised of storing information related to a plurality of users, a plurality of application pids, and a plurality of license information.

10. The non-transitory computer-readable medium of claim 8, wherein the computer-executable instructions cause the processing resource to further perform the steps comprising: communicating with a web server associated with a retailer, wherein the user data is obtained through a financial institution card used to purchase the application via a mobile device associated with the retailer, the mobile device being in communication with the web server.

11. The non-transitory computer-readable medium of claim 9, wherein the computer-executable instructions cause the processing resource to further perform the steps comprising: receiving a request from a user device regarding the identification of the application; and obtaining the application information from a web server associated with a application information service.

12. The steps of claim 8, further comprising:
   detecting no occurrence of the set of user-specified patient identifiers in the user data;
   in response to detecting no occurrence of the set of user-specified patient identifiers in the user data:
     a. routing the user data to the first VLAN;
   detecting an occurrence of the set of user-specified patient identifiers in the user data;
   in response to detecting the occurrence of the set of the user-specified patient identifiers in the user data;
     b. routing the user data by masking the set of user-specified patient identifiers to a second de-identified VLAN: and c. routing the set of user-specified patient identifiers to a third encrypted VLAN.

13. The steps of claim 12, further comprising:

enabling a user to select the identified application pid from a user device, the identified application pid having been previously purchased by the user.

\* \* \* \* \*